(12) United States Patent
Diaz et al.

(10) Patent No.: US 8,048,192 B2
(45) Date of Patent: Nov. 1, 2011

(54) METHOD OF MANUFACTURING NANOPARTICLES

(75) Inventors: Thomas Pompilio Diaz, San Martin, CA (US); Samson Hettiarachchi, Menlo Park, CA (US); Peter Louis Andresen, Niskayuna, NY (US); Young Jin Kim, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1639 days.

(21) Appl. No.: 11/320,707

(22) Filed: Dec. 30, 2005

(65) Prior Publication Data
US 2007/0151418 A1    Jul. 5, 2007

(51) Int. Cl.
*B22F 1/00* (2006.01)

(52) U.S. Cl. ......... 75/371; 427/436; 977/773; 502/439

(58) Field of Classification Search ............... 423/447.1; 75/370, 371; 977/896, 776; 426/436
See application file for complete search history.

(56) References Cited

U.S. PATENT DOCUMENTS

| | | | |
|---|---|---|---|
| 4,082,699 A | 4/1978 | Petrow et al. | |
| 4,888,209 A * | 12/1989 | Neely | 428/433 |
| 5,773,096 A * | 6/1998 | Hettiarachchi et al. | 427/436 |
| 6,057,488 A * | 5/2000 | Koper et al. | 588/409 |
| 6,307,099 B1 * | 10/2001 | Turner et al. | 562/412 |
| 6,716,525 B1 | 4/2004 | Yadav et al. | |
| 6,881,490 B2 * | 4/2005 | Kambe et al. | 428/447 |
| 7,311,754 B2 * | 12/2007 | Virkar et al. | 75/370 |
| 2002/0086969 A1 * | 7/2002 | DeBruin | 528/272 |
| 2004/0005723 A1 * | 1/2004 | Empedocles et al. | 438/1 |
| 2004/0139821 A1 * | 7/2004 | Yadav | 75/343 |
| 2004/0247516 A1 | 12/2004 | Pfefferle et al. | |
| 2005/0115362 A1 | 6/2005 | Virkar et al. | |

* cited by examiner

*Primary Examiner* — Melvin Mayes
*Assistant Examiner* — Melissa Stalder
(74) *Attorney, Agent, or Firm* — Harness, Dickey & Pierce, P.L.C.

(57) ABSTRACT

Provided are methods and systems for generating nanoparticles from an inorganic precursor compound using a hydrothermal process within at least one CSTR or PFR maintained at an elevated temperature and an elevated pressure and a treatment vessel in which this reaction solution can be applied to one or more catalyst substrates. In operation, the reaction solution may be maintained within the CSTR at a substantially constant concentration and within a reaction temperature range for a reaction period sufficient to obtain nanoparticles having a desired average particle size of, for example, less than 10 nm formation and/or deposition. Variations of the basic method and system can provide, for example, the generation of complex particle size distribution profiles, the selective deposition of a multi-modal particle size distribution on a single substrate.

19 Claims, 5 Drawing Sheets

METHOD OF MANUFACTURING NANOPARTICLES

FIELD OF THE INVENTION

The present invention relates to hydrothermal methods for producing nanoparticles. More particularly, the present invention relates to hydrothermal methods for producing nanoparticles at elevated temperatures and pressures from an inorganic precursor molecule capable of providing nanoparticles typically having an average diameter of less than about 10 nm.

BACKGROUND OF THE INVENTION

Depending on their composition and morphology, nanoparticles have demonstrated utility in various applications including, for example, catalysts, catalyst supports, electrodes, activated powders, energy storage, photovoltaics, ultra-fine magnetic materials, energetic materials, adsorbents and water purification. Nanoparticles can comprise one or more materials, for example, metals, nitrides, oxides and carbides, and can be provided in a range of morphologies that can increase their utility for certain applications.

Other nanoparticles include both single wall and multi-wall graphitic nanotubes and other graphitic fullerene structures (also referred to as Buckyballs). The various carbon-based nanoparticles are conductive, and may be made even more conductive, making them useful in, for example, sensors, energy storage, membrane electrode assemblies, nano arrays, nano mechanical switches, highly oriented pyrolytic graphite (HOPG), micro electro mechanical systems (MEMS), microfluidics, supercapacitors and fuel cell electrodes (also referred to as proton exchange membranes (PEM)).

In many cases, nanoparticles have also been used to improve the properties of materials at a level close to molecular dimensions. Thus, nanoparticles have been incorporated into molecular sieves (zeolites) for improved catalysis, and into fullerenes for changing their chemical and/or electrical properties. Nanospheres have been used for modifying the performance of photoresists and have been incorporated on to metal shells for surface modifications. Nanoparticles comprising metals and/or metal oxides, nitrides and carbides have also been used in manufacturing advanced ceramics and species selective sensors.

Some exemplary applications include, for example, platinum nanoparticles for oxygen reduction in acid electrolytes, various metallic powders for alloy fabrication and vehicular catalyst packs, iron oxide nanoparticles for catalyzing coal liquefaction or magnetic memory applications. Other oxide nanoparticles also have demonstrated utility in various applications including, for example, $CeO_x$ nanoparticles used during the catalytic reduction of $SO_2$, γ-alumina nanoparticles used as a catalyst support and for enhancing ionic conductivity of lithium iodide and $V_2O_5$ nanoparticles used for catalyzing $NO_x$ reduction.

Depending on the composition, size and morphology requirements of the final nanoparticles, a variety of processes have been developed for synthesizing the nanoparticles including, for example, gas-phase condensation, mechanical milling, thermal crystallization, chemical precipitation, sol-gel processing and aerosol spray pyrolysis.

In gas-phase condensation, one or more precursor compounds is evaporated into an inert gas atmosphere where the molecular interaction between the precursor compound(s) and the inert gas(es) reduces the kinetic energy in a super-saturated vapor to a point at which spontaneous homogeneous nucleation of nanoparticles occurs. This technique has been used to produce, for example, crystalline nanoparticles of $TiO_2$, $Li_2O$-doped MgO, $CeO_2$ and Y-doped $ZrO_2$. Aerosol spray pyrolysis has been used to synthesize a number of oxides including, for example, $BaFe_{12}O_{19}$ and $Fe_2O_3$.

Mechanical milling has also been used extensively for producing nanoparticles, particularly when large quantities of materials are required, some contamination is tolerable and/or the morphology of the nanoparticles is less critical. For example, nanoparticles of Ni/Al alloys, Fe/Co/Ni/Si alloys and Ni/Mo alloys have been produced by mechanical milling. As suggested, however, contamination from the milling process, i.e., particles from the vessel and/or milling elements is common and the resulting nanoparticles have been known to exhibit agglomeration that can result in nanoparticle clusters having sizes in the micron range.

Chemical precipitation, or coprecipitation, has also been widely used for synthesizing nanoparticles. In particular, both metallic and ceramic nanoparticles have been produced by carefully controlling the precipitation chemistry. For example, alkali metal borohydride, $MBH_4$ where M is an alkali metal, for example, has been used successfully as a reducing agent in aqueous media for synthesizing metallic nanoparticles. Similarly, hydroorganoborates having the general formula $MH_x(BR_3)$ or $MH_x[BR_n(OR')_{(3-n)}]_x$ where M is an alkali metal or an alkaline earth metal, x is 1 or 2, and R, R' are selected from a group consisting of substituted and unsubstituted alkyl and aryl groups have been used as both reducing and precipitating agents. It is important to control the pH and ionic strength of the solution from which the nanoparticles are being precipitated to prevent Ostwald ripening. During the synthesis of nanosize iron oxide, for example, solutions having higher pH values and higher ionic strength tend to produce smaller $Fe_3O_4$ nanoparticles.

Other conventional methods for generating nanoparticles include preparing platinum nanoparticles from a sol of $H_3Pt$ $(SO_3)$ in $H_2O_2$ as described in Petroco et al.'s U.S. Pat. No. 4,082,699, the contents of which is hereby incorporated by reference, in its entirety. Depending on the nature of the substrate this technique can be modified to produce nanoparticles in varying size ranges. Another conventional method utilizes organosols in combination with various stabilizers followed by hydrolysis to form particles close to or somewhat above ambient temperature. The organosols used in these methods have included one or more compounds, for example, organometallics, metal siloxanes and metal alkoxides, that can be subsequently hydrolyzed under differing chemical conditions. Other conventional methods include metal evaporation, decomposition of organometallics and reduction of metal salts as described in, for example, Tsai et al., *J. Amer. Chem. Sc.,* 113, 1650, 1991; and Perez-Maqueda et al., *J Mater. Research,* 12, 3286, 1997, the contents of which are hereby incorporated by reference, in their entirety.

Rapid thermal decomposition of solutions (RTDS) is another technique that is widely used to generate nanoparticles. In this technique, the solution is allowed to continuously flow through a heated section in a linear reactor then quenched by pressure reduction and the solution is sprayed on to a surface or to a container to generate the nanoparticles which are then separated. The solvent used in most cases are organics, and in a few cases water has been used. The reported nanoparticle size ranges achieved with such methods has been variable and relatively large at 50 nm, in some cases the particles have agglomerated to form micron size particles as described by Matson et al., *Mat'l Letters,* 14, 222, 1992, the contents of which is hereby incorporated by reference, in its entirety.

Regardless of the particular method used for producing the nanoparticles, there are several common concerns including, for example, the average size of the resulting nanoparticles, the size distribution of the resulting nanoparticles, the tendency of the particles to agglomerate and, for some applications, the morphology of the resulting particles. Secondary considerations include, for example, the tolerance of the method, the complexity of the method, the cost of the particles and environmental/safety concerns with regard to reactants required for and/or byproducts generated during operation of the method.

Agglomeration is often attributed to the action of the result of van der Waals forces between the nanoparticles and can be highly detrimental to the utilization of the nanoparticles. In many applications, the goal is to have the nanoparticles distributed generally uniformly over a substrate or carrier. Various techniques have been developed for maintaining separation between the nanoparticles and/or suppressing agglomeration including, for example, supercritical drying, sonication in an organic medium, for example an alcohol, stearic hindrance and/or electrostatic interactions. Nanoparticles have also been produced by sonicating larger commercially available nanospheres in organic solvents such as methanol to keep them suspended in the fluid and reduce their average size. These efforts, however, have been generally unsuccessful for the repeatable production of smaller, less than about 10 nm, nanoparticles.

Particularly in solutions and suspensions the distribution of nanoparticles in polar liquids can be achieved by manipulating the pH and the ionic strength of the liquid acting as the solvent or continuous phase and/or through the use of surfactants. Even when good dispersion has been achieved in a liquid phase, as the liquid is removed the likelihood of agglomeration increases. Other techniques, for example, slip-casting, gel-casting and pressure slip-casting have been developed for obtaining compacted nanoparticles, particularly for ceramic nanoparticles.

With the exception of mechanical milling in which larger starting particles are reduced through a series of mechanical collisions to more numerous nanoparticles, each of the production methods detailed above involve some degree of chemical synthesis wherein the nanoparticles are assembled by atom-by-atom, or molecule-by-molecule, addition. Even in processes based on decomposing one or more metallorganic compounds, for example, carbonyls, the nanoparticles typically grow by adding layers of atoms. Consequently, precise control of the nucleation and growth rate is necessary for ensuring the resulting nanoparticles are within the desired size range.

Such control, however, often necessitates very precise control of the reaction system, thereby increasing the difficulty of the fabrication process and rendering large-scale production impractical and/or inefficient. Further, the capital expense associated with the equipment and instrumentation necessary for successful molecular synthesis processes tends to be quite high relative to the amount of material that can be produced. Accordingly, research continues for methods that can produce the desired nanoparticles more efficiently and/or less expensively.

SUMMARY OF THE INVENTION

Example embodiments of methods according to the invention provide techniques for fabricating nanoparticles that may be implemented on a relatively large scale and/or in conventional reactor equipment. Example embodiments of methods according to the invention provide for the repeatable production of nanoparticles having average particle sizes of less than 10 nm. Other example embodiments of methods according to the invention provide for the repeatable production of nanoparticles having average particle sizes on the order of about 100 nm.

The example embodiments of methods according to the invention achieve this result without using organometallic compounds and in an aqueous medium, thereby providing methods that are generally less expensive to practice and that may also reduce the safety and environmental issues associated with the use of organic compounds, particularly when compared with conventional molecular synthesis methods.

Example embodiments of methods according to the invention incorporate a high temperature hydrothermal technique for generating nanoparticles that can be made much smaller (typically less than about 10 nm) than that which can typically be achieved with the conventional methods while still exhibiting an acceptable uniformity in size as well as in size distribution. Example embodiments of methods according to the invention utilize one or more continuously stirred tank reactors (CSTR) that can be used for generating dimensionally stable particles falling primarily within a number-weighted average size from about 2 nm to 8 nm without using any organometallic precursor compounds and in an aqueous medium.

Example embodiments of methods according to the invention also provide for the deposition of the nanoparticles being generated within the CSTR on the surfaces of one or more substrate materials provided within the reactor. The example embodiments of the methods according to the invention also provide for the deposition of the generated nanoparticles within a matrix of substrate or support material. The substrate materials on which the nanoparticles are deposited may be generally inert or may be constituted to provide an activity for complementing, enhancing or controlling the activity of the deposited nanoparticles using physical and/or chemical effects. By depositing the nanoparticles on the substrate within the reactor as the nanoparticles are being generated, a second deposition stage may be avoided. Similarly, by depositing the nanoparticles on the substrate as they are formed within the reactor, i.e., an in-situ deposition, many of the issues regarding dispersion and agglomeration can also be avoided.

BRIEF DESCRIPTION OF THE DRAWINGS

The invention will become more apparent by describing in detail exemplary embodiments thereof with reference to the attached drawings in which.

Figure 1:
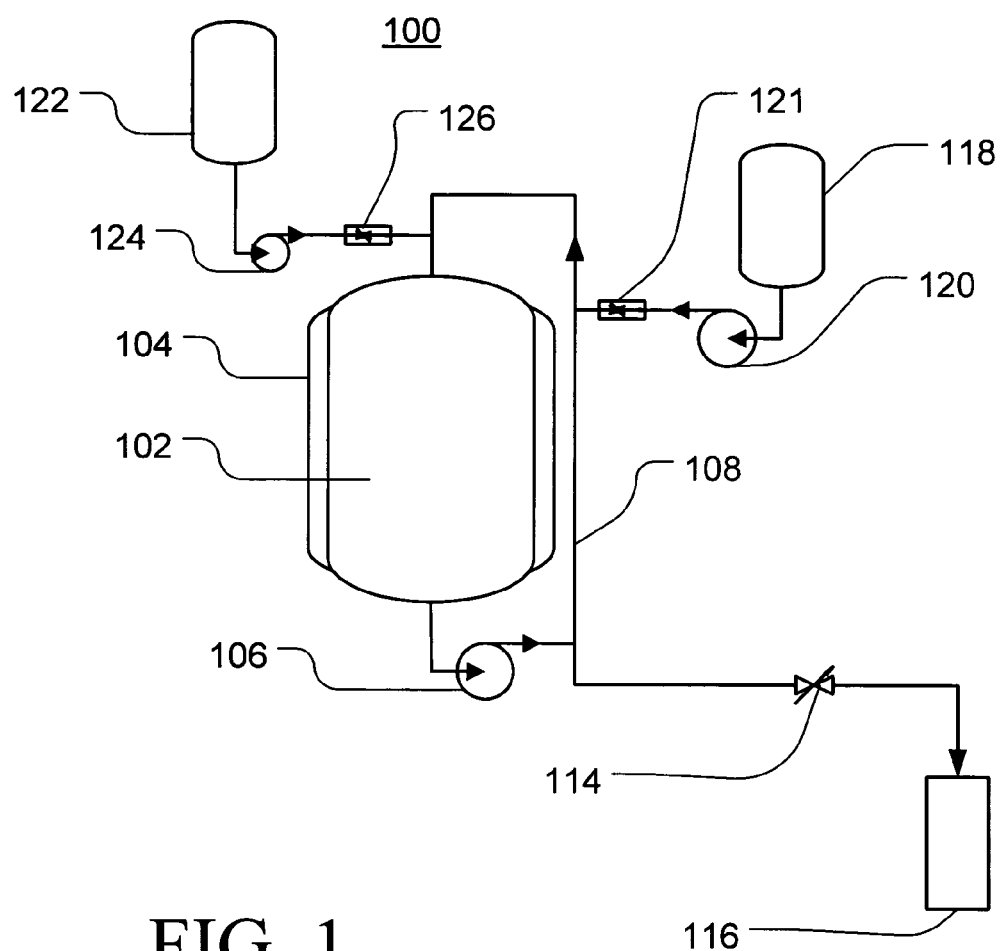
FIG. 1 illustrates an example embodiment of a reactor system suitable for practicing the methods according to the invention.

These drawings have been provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity.

Those of ordinary skill in the art will also appreciate that a range of alternative configurations have been omitted simply to improve the clarity and reduce the number of drawings. Those of ordinary skill will appreciate that certain of the various process steps illustrated or described with respect to the exemplary embodiments may be selectively and independently combined to create other methods useful for manufacturing semiconductor devices without departing from the scope and spirit of this disclosure.

DETAILED DESCRIPTION OF EXAMPLE EMBODIMENTS

As described generally above and in detail below, example embodiments of the method according to the invention generates nanoparticles using a hydrothermal process in an apparatus or reactor system that includes at least one CSTR suitable for operation at elevated temperatures and elevated pressures. During the production of the nanoparticles and/or the treatment of the substrates, the reaction solution may be maintained at a substantially constant reaction temperature range for the duration of the nanoparticle formation and/or deposition.

Alternatively, the temperature, concentration, agitation and/or pressure of the reaction solution may be deliberately altered during the nanoparticle formation and/or deposition to produce a more complex particle size distribution profile. For example, the reaction solution may be maintained at a first reaction temperature $T_1$ for a first reaction period $P_1$ to obtain a first distribution of nanoparticle sizes $D_1$. At the conclusion of the first reaction period, the reaction solution may be heated or cooled to obtain a second reaction temperature $T_2$ and maintain the second reaction temperature for a second reaction period $P_2$ to obtain a second distribution of nanoparticle sizes $D_2$. As will be appreciated by those skilled in the art, this technique may be utilized to produce a substantially bimodal nanoparticle size distribution and, if desired, could be expanded to provide a multimodal nanoparticle size distribution.

The nanoparticles comprising the first and second particle distributions can, in turn, be simultaneously or sequentially deposited on the same surfaces or, through modification of the deposition conditions, be preferentially deposited on different surfaces of a single substrate. For example, a porous substrate may be provided in which the pore size distribution is such that nanoparticles from one distribution may be deposited within the pores while nanoparticles from the other distribution may generally be excluded from the pores and deposited primarily on the surfaces extending between the pores.

The elevated temperatures utilized in the example embodiments of methods according to the invention may range from about 38° C. (100° F.) up to the critical point for water, about 356° C. (673° F.) at pressures on the order of 8.3 MPa (1200 psi) or more. Example embodiments of methods according to the invention were performed at temperatures of about 135° C. (275° F.) and about 282° C. (540° F.) and a pressure of 8.3 MPa (1200 psi) for obtaining representative nanoparticle size distributions.

Figure 2:
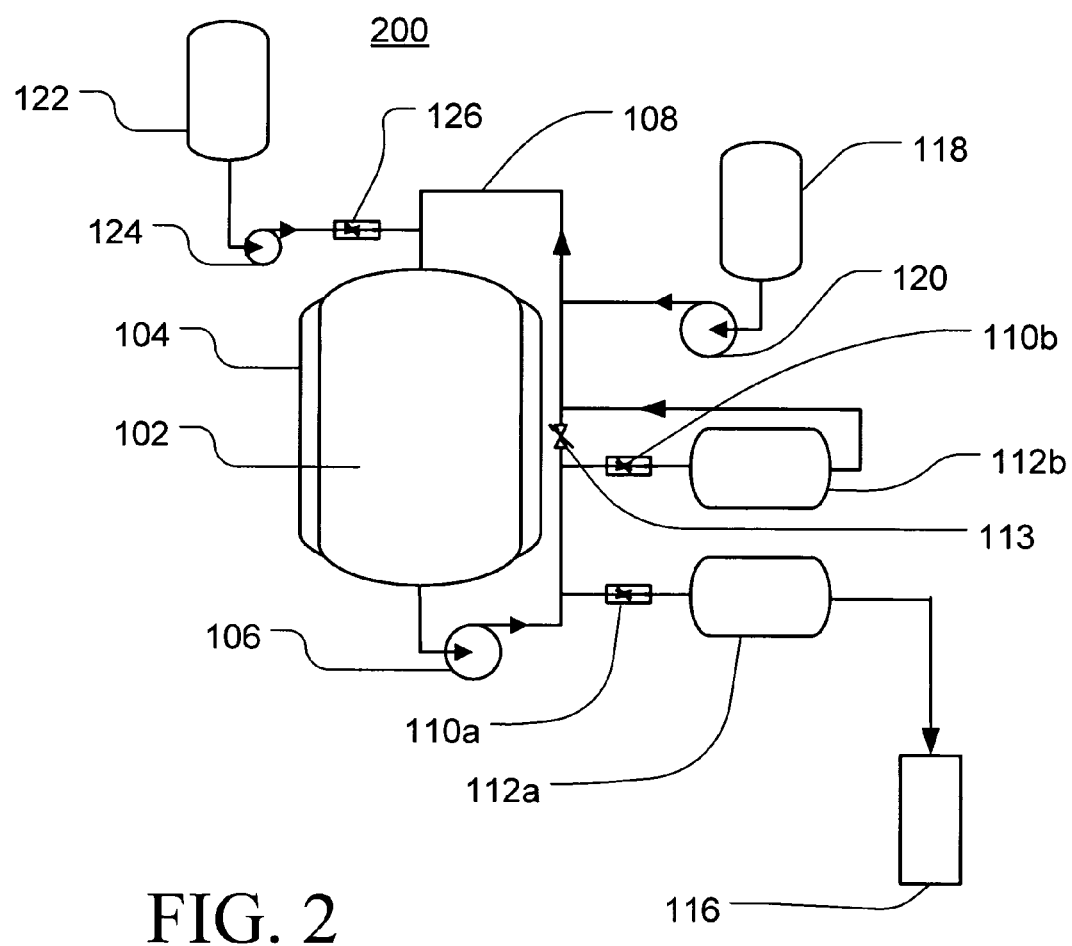
FIG. 2 illustrates another example embodiment of a reactor system suitable for practicing the methods according to the invention.
Figure 3:
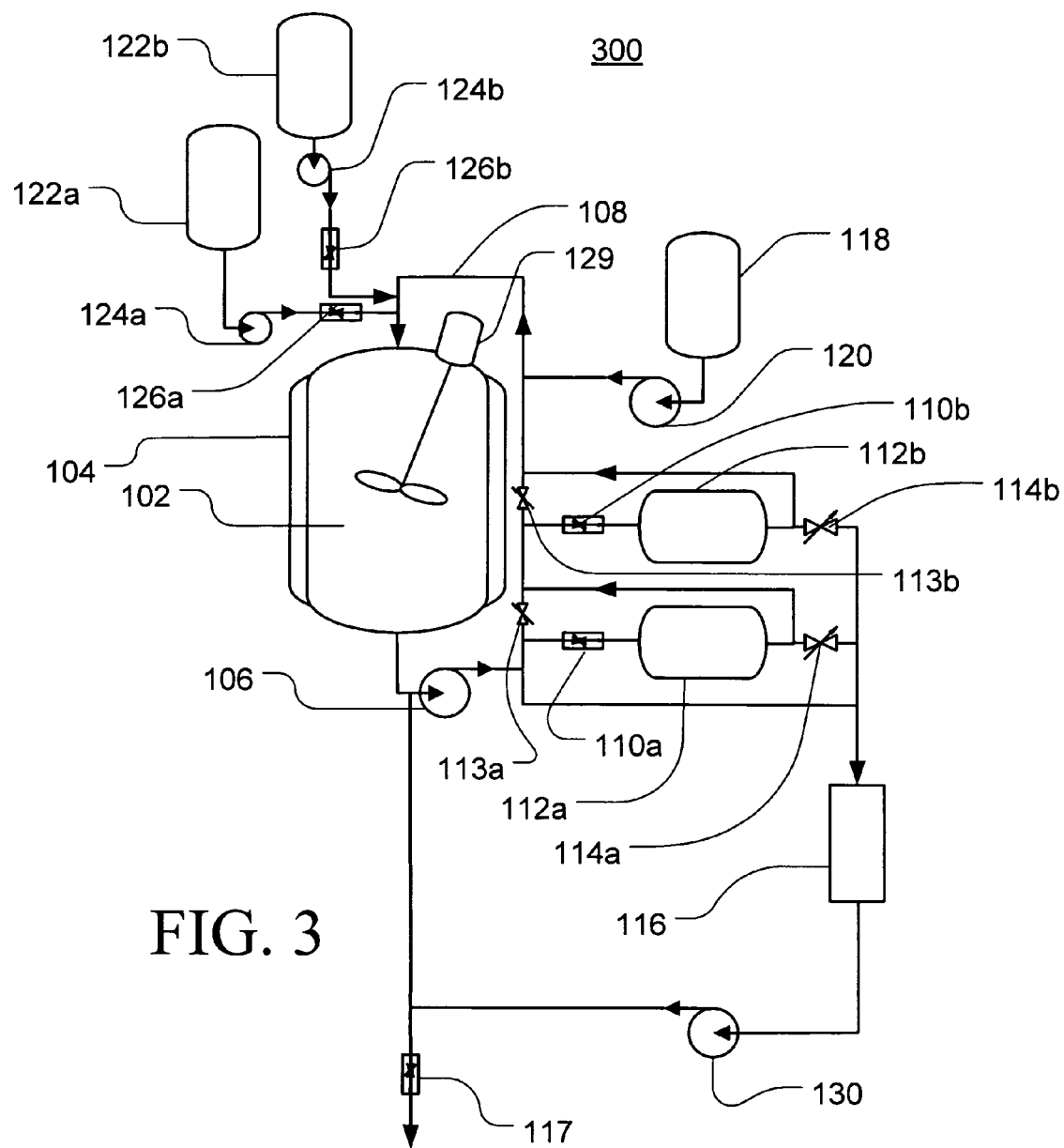
FIG. 3 illustrates another example embodiment of a reactor system suitable for practicing the methods according to the invention.

A schematic corresponding generally to the example embodiment of CSTR nanoparticle generation system used to demonstrate the utility of methods according to the invention is shown in FIG. 2. As will be appreciated by those skilled in the art, various components have been omitted from the schematic diagrams of FIGS. 1-3 in the interest of clarity. FIGS. 1-3 do not, therefore, illustrate various conventional components utilized during the operation of the illustrated system including, for example, heater controls, back pressure regulator, monitors, check valves, drains, storage tanks, regenerative heat exchanger, chemistry control system, control lines, test points, sensors and other control components that those skilled in the art will appreciate may be present in an operative system.

As illustrated in FIG. 1, an example embodiment of a system 100 according to the invention includes a main reactor vessel (CSTR) 102, for example, a stirred (or otherwise agitated) autoclave, which may be heated with a jacket heater 104 or immersed heater elements (not shown). Reaction solution may be removed from the main reactor vessel 102 using a recirculating pump 106 to move the reaction solution through a recirculation loop 108. Because a portion of the reaction solution will be removed from the system, the system 100 will typically include a make-up water supply 118 from which water may be added to the recirculating flow through a pump 120 and/or a control valve 121 to maintain the volume of the reaction solution within the system.

A precursor solution of one or more inorganic compounds may be injected into the main reactor vessel 102 or, preferably, into a portion of the recirculation loop 108 shortly before the recirculating reaction solution is returned to the main reactor vessel 102. The masterbatch or precursor solution will have a concentration above that of the reaction solution and will typically be injected into the recirculating reaction solution at a rate that will maintain the concentration within the reaction solution within a target concentration range. As illustrated in FIG. 1, the precursor solution may be maintained in a vessel 122 and injected into the recirculating system through a pump 124 and/or a control valve 126. The rate and location within in recirculating system at which the precursor solution is injected will typically be of sufficient volume and turbulence so that the concentrated precursor solution is rapidly dispersed in the reaction solution and generally avoids exposing concentrations above that of the reaction solution to the reaction conditions within the main reactor vessel for an extended period.

As illustrated in FIG. 1, the system may also include a bypass path controlled by valve 114 through which a portion of the reaction solution can be withdrawn from one or more components or lines within the recirculation loop 108, including, for example, the main reactor vessel 102 (not shown), for direct disposal, clean-up or other remedial treatment in an apparatus 116 followed by disposal and/or reintroduction into the recirculation loop, storage or offline treatment of substrates.

The recirculation flow rate may be set to provide a wide range of residence times within the main reactor vessel 102. For example, depending on the reactor sizing and the desired reaction conditions, the residence time within the reactor may vary, for example, between a few minutes and several hours or even, in some cases, a day or more. As will be appreciated by those skilled in the art, in shorter residence time configurations (high flow rate) the turbulence of the reaction solution being injected into the main reactor vessel 102 may provide sufficient mixing and preform as a CSTR. Conversely, in longer residence time configurations the reaction solution within the main reactor vessel 102 will typically require additional agitation using mixers, impellers and/or other mechanisms to maintain the reaction solution in a CSTR state. Similarly, those skilled in the art will appreciate that the residence time and the configuration of the main reactor vessel 102 may also be arranged to provide a wide range of average velocities for the flow of the reaction solution through the main reactor vessel.

The main reactor vessel 102 and, optionally, one or more portions of the recirculating loop 108, may be heated using a heater jacket 104 and/or any other suitable conventional heating apparatus or combination of heating apparatus. The heater (s) will typically be automatically controlled (not shown) in order to maintain the temperature of the reaction solution within the main reactor vessel 102 within a target reaction temperature range. As will be appreciated by those skilled in the art, the degree of temperature control which can be achieved will depend, in large part, on the configuration of the heating system, heat losses in other portions of the recirculation system and the sensitivity, capacity and responsiveness of the associated control system.

Without being bound by theory, it is suspected that by maintaining the main reactor vessel 102 in a CSTR condition, ensuring that the concentrated precursor solution is quickly mixed into the bulk reaction solution and maintaining appropriate reaction conditions, for example a particular combination of temperature, pressure and pH, within the main reactor vessel the system and method of operating the system according to the invention can be used to produce nanoparticles having an average particle size of less than 10 nm. These nanoparticles can, in turn, be applied to a variety of substrates arranged within the recirculation loop, for example, within a region of the main reactor vessel 102, to produce, for example, catalyzed or seeded surfaces.

Illustrated in FIG. 2, is another example embodiment of a system 200 according to the invention including many of the components illustrated in FIG. 1 and discussed above. The example embodiment of the system 200, however, incorporates one or more treatment vessels 112a, 112b (collectively 112) in which substrates may be exposed to the reaction solution under conditions that may differ from those present in the main recirculation loop and better adapted for the particular substrate being treated, e.g., to avoid dissolving or otherwise damaging or degrading the substrate. A wide variety of substrates can be treated in this manner including, for example, ceramics, carbon fibers, carbon nanotubes, membranes (e.g., PEM structures) and mineral fibers.

As illustrated in FIG. 2, a treatment vessel 112a may be configured as a portion of a bypass path controlled by valve 110a whereby reaction solution is disposed and/or treated after passing through the treatment vessel 112a. This configuration is particularly useful for treating substrates that would tend to contaminate the reaction solution and render it in some way unsuitable for direct reintroduction into the recirculation loop 108. As also illustrated in FIG. 2, a treatment vessel 112b may be configured as a portion of the recirculation loop 108. The flow of the reaction solution through the treatment vessel 112b may be regulated by a control valve 110b. The flow of the reaction solution through the treatment vessel may represent only a portion of the recirculating flow or, through closure of valve 113, may constitute the entire recirculating flow of the reaction solution.

Illustrated in FIG. 3, is another example embodiment of a system 300 according to the invention including many of the components illustrated in FIGS. 1 and 2 and discussed above. The example embodiment of the system 300, however, incorporates treatment vessels 112a, 112b (collectively 112) that may be operated in parallel or in series. As illustrated in FIG. 3, flow of the reaction solution into the treatment vessels 112a, 112b may be by valves 110a, 110b. After passing through the treatment vessels 112, the reaction solution may be disposed or forwarded for treatment through valves 114a, 114b or may be recirculated.

As also illustrated in FIG. 3, the flow of the reaction solution through the treatment vessels 112 may represent only a portion of the recirculating flow or, through the closure of valves 113a, 113b, may constitute the entire recirculating flow of the reaction solution. As illustrated in FIG. 3, the "bypassed" reaction solution may be treated and/or reconditioning in an apparatus 116 and then returned to the recirculating loop 108 through, for example, pump 130, or disposed through valve 117 to a drain or appropriate waste treatment facility. The treatment within apparatus 116 may include, for example, recovering noble metals, removing contaminants, adjusting pH and/or neutralizing reactants.

As illustrated in FIG. 3, the main reactor vessel 102 may be provided with one or more stirring or agitating devices 129 for maintaining the reaction solution within the vessel in a well mixed state. As illustrated in FIG. 3, the system 300 may include multiple precursor and/or treatment solutions maintained in vessels 122a, 122b that can be selectively and controllably injected into the recirculating system through pumps 124a, 124b and/or a control valves 126a, 126b. The rate and location within in recirculating system at which the precursor and/or treatment solutions is injected will typically be selected to provide sufficient flow volume and turbulence whereby the concentrated precursor and/or treatment solution (s) will be rapidly dispersed in the reaction solution and thereby avoid exposing concentrated reactants to the reaction conditions maintained within the main reactor vessel 102 other than for a very brief period of time.

As illustrated in FIGS. 2 and 3 and discussed above, a portion of the reaction solution may be diverted from the primary recirculation path 108 and routed through one or more treatment vessels 112a, 112b, in which one or more substrates are maintained. The reaction solution may be passed through the treatment vessels at a controlled velocity to provide, for example, a high flow rate treatment, e.g., at least about 0.58 meters per second (1.9 ft/sec), an intermediate flow rate treatment, e.g., from about 0.06 to 0.58 meters per second (0.2 to 1.9 ft/sec) and/or a low flow rate treatment, e.g., no more than about 0.06 meters per second (0.2 ft/sec). The conditions within the treatment vessels may also be controlled through the use of auxiliary heaters (not shown) and pressure control apparatus (not shown) to establish treatment conditions differing from the conditions maintained in the main reactor vessel 102 that may be better adapted for a particular substrate configuration.

In addition to controlling the temperature and pressure conditions within the treatment vessels 112a, 112b, additional agitation of the reaction solution and/or the substrate may be provided by any conventional means including, for example, stirrers, rockers, tumblers and/or one or more ultrasonic transducers so improve the wetting of the substrate by the reaction solution, particularly into obstructed or "dead" regions including, for example, cavities or recesses having small openings and high aspect ratios. The reaction solution flowing through the treatment vessels provides in-situ nanoparticle deposition on the surfaces of any component or substrate provided within the treatment vessel.

As suggested by the system 300 illustrated in FIG. 3, two or more (not shown) treatment vessels may be operated in a parallel fashion whereby one or more of the treatment vessels 112 can be taken offline by actuating appropriate valves and the pressure within the offline treatment vessel(s) can be reduced to ambient. The "offline" treatment vessel can then be opened and the treated substrate removed and a new substrate placed in the treatment vessel. The treatment vessel can then be closed, filled with liquid and brought back online by being reconnected to the recirculating loop 108 to initiate treatment of the next substrate. During the time that the treated and untreated substrates are being exchanged in one treatment vessel, the treatment of substrate(s) maintained in the parallel treatment vessels can continue unabated.

As will be appreciated by those skilled in the art, the nature of the nanoparticle deposition on the substrates may be controlled to some extent by selection of, for example, the treatment temperature, pressure, flow rate and/or flow velocity, as well as treatment time. Further, depending on the configuration of the substrate, surface treatments and/or orientation may also affect the distribution of the nanoparticles across the substrate surface(s) that can range between a generally uniform dispersion of the nanoparticles on the substrate (as illustrated in FIG. 4) or to provide a non-uniform dispersion in which, for example, the density of the nanoparticle dispersion varies along one or more dimensions of the treated substrate.

The combination of the make-up water addition from vessel or supply 118, the injection of the chemical species from vessels 122 and the withdrawal of reaction solution through the clean-up line are typically balanced to keep the recirculation systems illustrated in FIGS. 1-3 filled with a reaction solution having a suitable concentration of the desired chemical species. Keeping the system filled will tend to reduce the risk of portions of the heated and pressurized reaction solution "flashing" to vapor within the recirculation system or within the CSTR, particularly at those portions of the system, if any, in which there is some decrease in the system pressure.

Without being bound by theory, it is suspected that the advantages of the nanoparticle generation systems and methods detailed in connection with FIGS. 1-3 according to the example embodiments of the invention over a conventional plug flow reactor (PFR) system may be attributed to the rapid dispersal and reaction of the injected inorganic precursor compounds. The generated nanoparticles are then maintained within the circulation system 108 under conditions that suppress agglomeration until the nanoparticles are deposited on a substrate or otherwise removed from the recirculating system through, for example, the clean-up apparatus 116. Because a typical clean-up rate may be only about 1-3% of the solution passing through the nanoparticle generation system at a given time, about 97-99% of the reaction solution is typically recirculated and will receive supplemental reactants and/or other adjustments as it is returned to the main reactor vessel 102 for additional nanoparticle generation.

Figure 4:
FIG. 4 is a SEM photomicrograph of sub-10 nm nanoparticles distributed across the surface of crystallites on a pre-oxidized stainless steel surface as prepared using a first example embodiment of a method according to the invention.

Further, again without being bound by theory, it appears that control of the pH of the recirculation solution to maintain a pH at which the nanoparticles will tend to carry a similar charge tends to suppress agglomeration and provide a generally uniform distribution on the substrate as illustrated in FIG. 4. Accordingly, the particular pH range maintained within the nanoparticle generation system will depend to some degree on the composition of the nanoparticles being generated. The appropriate pH for a particular nanoparticle composition will be related to the zeta potential ($pH_0$) for the particular composition. Those skilled in the art can obtain or determine the zeta potential for a particular composition using conventional art references and/or known procedures and can select an appropriate operating pH range accordingly.

As will be appreciated by those skilled in the art, the removal rate will be influenced to some extent by the quality of the make-up water in order to maintain the system with a suitable number of cycles of concentration (COC) with regard to any impurities introduced by the make-up water. By utilizing this example method, the example nanoparticle generation systems as illustrated in FIGS. 1-3 may be used to produce nanoparticles having a desired particle size range for deposition on a substrate and/or for removal from the generation system for use in subsequent processes or additional processing for altering the chemical and/or mechanical characteristics of the generated nanoparticles.

As will be appreciated by those skilled in the art, the rate at which the nanoparticles are produced and grow to the desired size range will be a function of the particular chemical species, particularly its hydrolysis and solubility characteristics in water at the temperature and pressure conditions. Other factors with regard to the nanoparticle size will typically include the flow velocity and the residence time (i.e., the average time that a particle will spend in the reactor and recirculation system before it is removed by deposition onto a substrate or by the clean-up system). The system may also be configured to provide for alternative flow patterns and may bypass the clean-up system under appropriate conditions whereby the make-up water need only compensate for the reaction solution lost while changing the substrates and the chemical species injection need only compensate for those particles removed on the treated substrate(s) or lost with the reaction solution.

EXAMPLE

Pt Nanoparticles

Platinum nanoparticles were generated in a reactor system generally corresponding to the example embodiment illustrated in FIG. 2 using an aqueous Pt reaction solution of $Na_2Pt(OH)_6$ at a Pt concentration of 465 ppb (by total weight). As will be appreciated by those skilled in the art, the concentration range of the chemical species can generally be controlled from, for example, about 1 ppb to several ppm, without substantial difficulties, depending on both the desired average particle size and the desired particle size distribution.

Unlike the conventional methods discussed above, the present method does not require additional organic or inorganic compounds. The concentrated chemical feed, for example a masterbatch composition, can be injected into the recirculation system at a point upstream from the main reactor vessel where the volume and turbulence of the flow is sufficient to mix and substantially dilute the concentrated chemical feed before it enters the main reactor vessel. For example, with a recirculation flow of about 90 cc/min, the chemical species injection rate, in this instance, the Pt solution feed rate, into the recirculating or drive water can be about 1 cc/min. One of the primary purposes of the drive water flow and the sizing of the associated pumps and lines is to carry a solution of the precursor compound rapidly into the high temperature section, for example the CSTR or main reactor vessel, in order to produce corresponding metal particles within a desired size range and size distribution.

Depending on the conditions within the CSTR and the speed with which the new chemical species reaches the CSTR, primary or seed nanoparticles begin being formed almost instantly, with the rate at which the seed nanoparticles grow by accumulating additional atoms, molecules or layers being further controlled by the conditions, e.g., temperature, pressure and concentration within the system. Under the conditions noted above, the initial Pt species solution will typically be quickly diluted by the drive water or recirculating reaction solution from an initial concentration of about 400-500 ppb (Pt) to a concentration of about 1 to 10 ppb (Pt). As will be appreciated by those skilled in the art, however, the concentration of the reaction solution may be varied depending on the chemical species and the particle size desired with higher concentrations tending to produce larger nanoparticles, all other parameters being equal. Depending on the concentrations and reactions conditions, the particle generation test was carried out for periods ranging from a few days to three weeks, again depending on the particle size desired.

Figure 5:
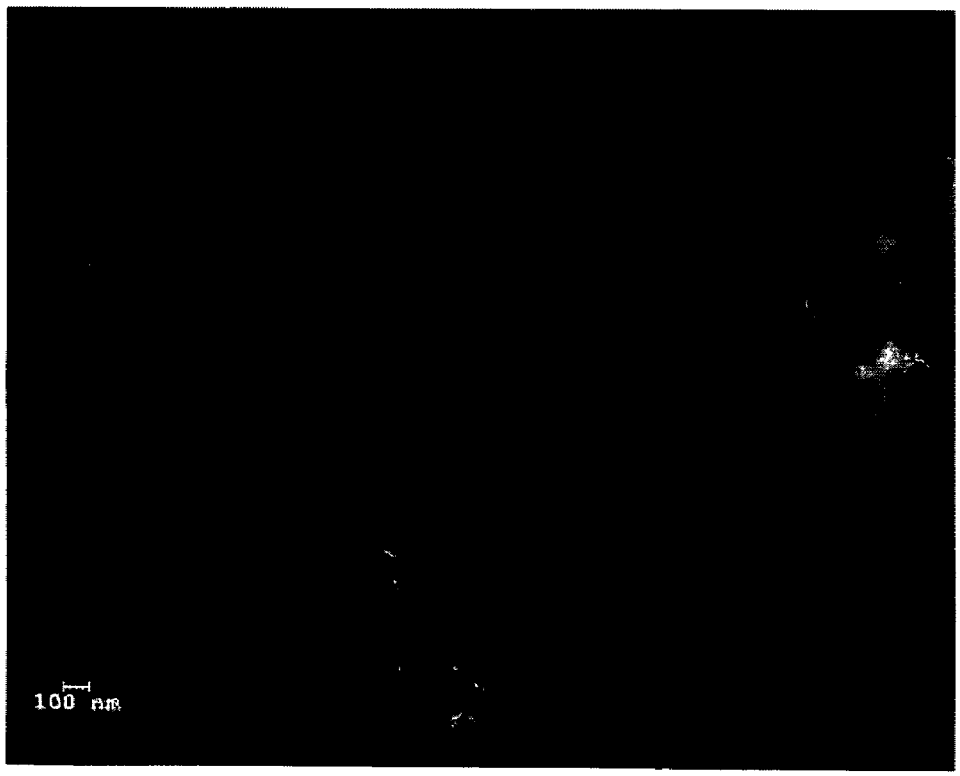
FIG. 5 is a SEM photomicrograph of larger nanoparticles, on the order of 50-150 nm, distributed across the surface of crystallites on a pre-oxidized stainless steel surface as prepared using a second example embodiment of a method according to the invention.

Because the initial nanoparticles are generated by rapid hydrothermal hydrolysis as the precursor compound enters the recirculating stream, they tend to be very small, in the range of 2 to 8.5 nm in most cases at a reaction temperature of 282° C. (540° F.). Because the particles are very small, rather than separating them to determine their size and distribution, they were deposited in situ on an oxidized stainless steel surface so that they can be imaged using a high resolution scanning electron microscope (SEM). FIGS. 4 and 5 illustrate examples of the size and distribution of the Pt nanoparticles (which appear as lighter dots or specks on the steel surface) deposited on oxidized stainless steel at the two temperatures. The lighter dots were subsequently confirmed as Pt nanoparticles using electron probe microanalysis (EPMA).

Figure 6:
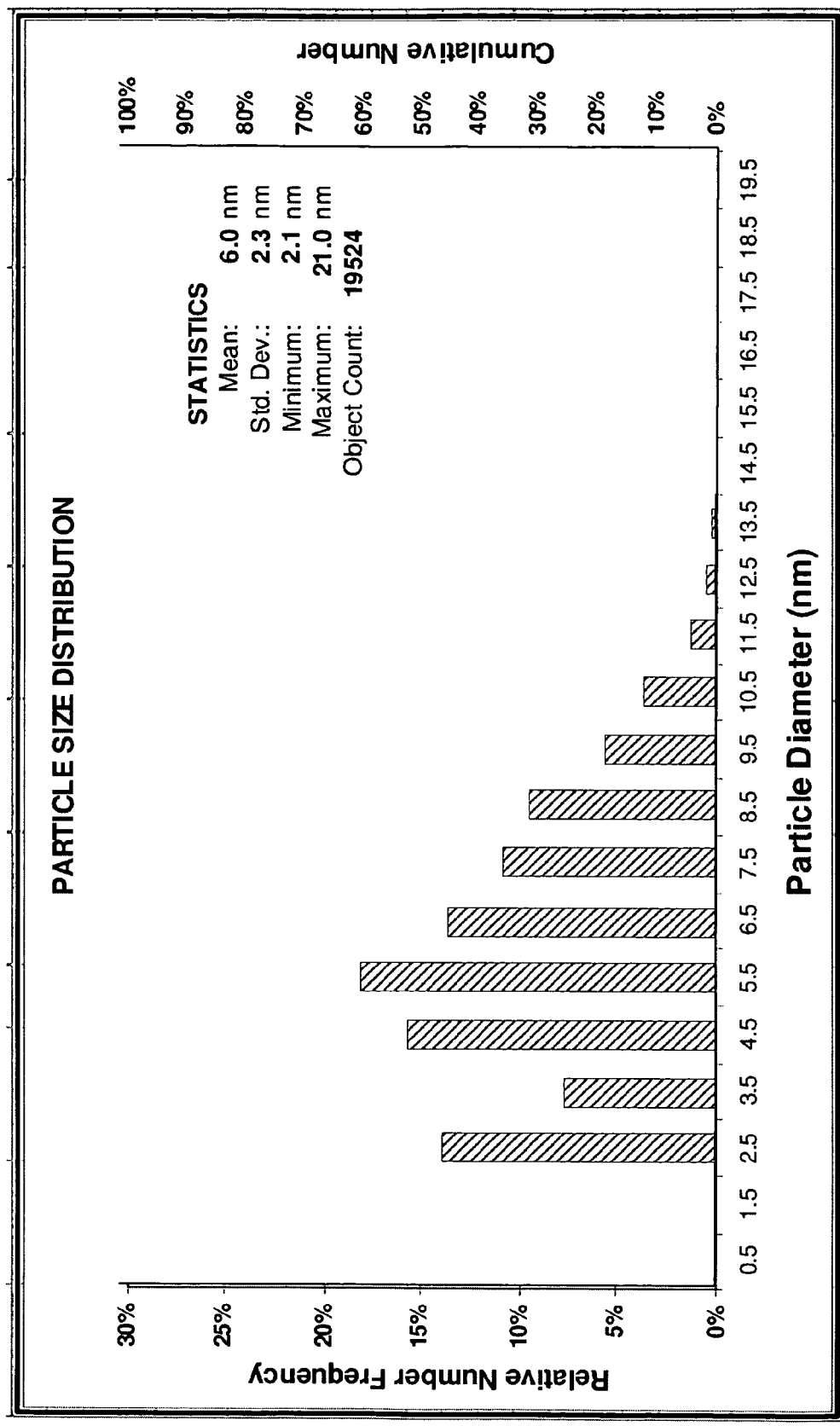
FIG. 6 is a chart reflecting a particle size analysis of the distributed nanoparticles prepared using a first example embodiment of a method according to the invention as illustrated in FIG. 4.

The size distribution of the nanoparticles illustrated in FIG. 4 is shown in FIG. 6. Conversely, simply reducing the reaction temperature to about 135° C. (275° F.) substantially increases the average size of the nanoparticles to about 50 to 150 nm as illustrated in FIG. 5. Clearly, FIGS. 4 and 5 demonstrate that utilizing an embodiment of a method according to the invention at a reaction temperature of about 282° C. produced nanoparticles having both a generally uniform size, with most particles below 10 nm, as well as a fairly narrow size distribution. Conversely, application of a method according to an example embodiment of the invention at 135° C. produced larger nanoparticles having a larger average particle size and broader size distribution and exhibiting some agglomeration as illustrated in FIG. 5.

Accordingly, smaller particles and narrower size distributions tend to be achieved at higher temperatures and lower concentrations of the inorganic precursor compound(s). Although the example detailed above utilized a Pt compound for forming Pt nanoparticles, those skilled in the art will appreciate and expect that the disclosed method and apparatus can be utilized for forming and depositing nanoparticles of a variety of metals including, for example, other Pt group metals Pd, Rh, Ru, Os and Ir, as well as various non-Pt group metals for which a suitable inorganic precursor compound is available.

The generation of nanoparticles by high temperature hydrothermal hydrolysis does not always require a CSTR. It can be done in a plug flow system as well, the difference being the particle size and uniformity because of the much longer resident time available in the CSTR. The particle generation by the CSTR approach or the plug flow approach can be used for any metal using one of its compounds, organic, inorganic or organometallic. The inorganic compounds have the advantage in that the resultant byproducts are relatively harmless compared to using organics or organometallics. The method can also be used to generate nanoparticles of oxides such as $ZrO_2$, $Y_2O_3$, $TiO_2$, $Fe_2O_3$, $Fe_3O_4$, NiO and similar oxides or mixtures of oxides that can be used in the generation of advanced ceramics.

Although the invention has been described in connection with certain example embodiments, it will be evident to those of ordinary skill in the art that many alternatives, modifications, and variations may be made to the disclosed methods in a manner consistent with the detailed description provided above. Also, it will be apparent to those of ordinary skill in the art that certain aspects of the various disclosed example embodiments could be used in combination with aspects of any of the other disclosed embodiments or their alternatives to produce additional, but not herein illustrated, embodiments incorporating the claimed invention but more closely adapted for an intended use or performance requirements. Accordingly, it is intended that all such alternatives, modifications and variations that fall within the spirit of the invention are encompassed within the scope of the appended claims.

As will be appreciated by those skilled in the art, nanoparticles fabricated according to the example embodiments of the methods according to the invention described above may be used in a variety of demanding applications including, for example, manufacturing industrial catalysts for petroleum cracking, manufacturing vehicular catalytic converters, catalyst packings for gas oxidations and reductions, recombination catalysts, and fabricating fuel cell electrodes, supercapacitors and advanced ceramics. Indeed, it is anticipated that the invention can be widely utilized for depositing nanoparticles comprising, for example, metal and/or metal oxides on, incorporating in or impregnating a substrate that may include carbon, ceramic, metallic or non-metallic particles and/or matrices.

We claim:

1. A method for fabricating nanoparticles comprising:
   injecting concentrated aqueous reaction solution of an inorganic precursor compound including a target element from a first vessel into a recirculation loop to obtain a first diluted aqueous reaction solution;
   introducing the first diluted aqueous reaction solution into a second vessel via the recirculation loop to obtain a second diluted aqueous reaction solution, the first diluted aqueous reaction solution introduced from the recirculation loop having a target element concentration that is less than that of the concentrated aqueous reaction solution injected from the first vessel, the second diluted aqueous reaction solution in the second vessel having a target element concentration that is less than that of the first diluted aqueous reaction solution injected from the recirculation loop; and
   hydrolyzing the inorganic precursor compound at an elevated temperature and an elevated pressure to form nanoparticles of the target element within the second diluted aqueous reaction solution of the second vessel.

2. The method for fabricating nanoparticles according to claim 1, wherein:
   the nanoparticles have an average size of less than 20 nm.

3. The method for fabricating nanoparticles according to claim 2, wherein:
   the nanoparticles have an average size of less than 10 nm.

4. The method for fabricating nanoparticles according to claim 1, wherein:
   the elevated temperature is at least 38° C. (100° F.); and
   the elevated pressure is at least 1.4 MPa (200 psi).

5. The method for fabricating nanoparticles according to claim 4, wherein:
   the elevated temperature is at least 135° C. (275° F.); and
   the elevated pressure is at least 4.1 MPa (600 psi).

6. The method for fabricating nanoparticles according to claim 5, wherein:
the elevated temperature is at least 282° C. (540° F.); and
the elevated pressure is at least 8.3 MPa (1200 psi).

7. The method for fabricating nanoparticles according to claim 1, further comprising:
treating the nanoparticles of the target element to produce secondary nanoparticles selected from a group consisting of oxides, nitrides and carbides of the target element.

8. The method for fabricating nanoparticles according to claim 1, further comprising:
maintaining a target pH within the second diluted aqueous reaction solution sufficient to induce a common surface charge on the nanoparticles.

9. The method of claim 1, wherein the target element concentration of the concentrated aqueous reaction solution is reduced by at least about 97.5% to obtain the first diluted aqueous reaction solution.

10. The method of claim 1, wherein the target element concentration of the concentrated aqueous reaction solution is about 400-500 ppb, and the target element concentration of the first diluted aqueous reaction solution is about 1 to 10 ppb.

11. The method of claim 1, wherein a ratio of a volumetric injection rate of the concentrated aqueous reaction solution to a volumetric flow rate of a recirculation flow in the recirculation loop is about 1:90.

12. A method for preparing catalysts comprising:
injecting concentrated aqueous source solution of an inorganic precursor compound including a target element from a first vessel into an aqueous stream to form a first diluted reaction solution;
introducing the first diluted reaction solution into a second vessel to form a second diluted reaction solution, the first diluted reaction solution having a target element concentration that is less than that of the concentrated aqueous source solution injected from the first vessel, the second diluted reaction solution in the second vessel having a target element concentration that is less than that of the first diluted reaction solution;
hydrolyzing the inorganic precursor compound within the second diluted reaction solution at an elevated temperature and an elevated pressure to form nanoparticles of the target element dispersed in the second diluted reaction solution in the second vessel;
flowing the second diluted reaction solution past a catalyst substrate; and
depositing a portion of the nanoparticles from the second diluted reaction solution onto the catalyst substrate.

13. The method for preparing catalysts according to claim 12, wherein:
the nanoparticles have an average particle size of less than 20 nm.

14. The method for preparing catalysts according to claim 13, wherein:
the nanoparticles have an average particle size of less than 10 nm.

15. The method for preparing catalysts according to claim 12, further comprising:
maintaining a target pH within the second diluted reaction solution sufficient to induce a common surface charge on the nanoparticles.

16. The method for preparing catalysts according to claim 15, further comprising:
establishing an opposite common charge on the catalyst substrate to induce deposition of nanoparticles having the common surface charge.

17. The method of claim 12, wherein the target element concentration of the concentrated aqueous source solution is reduced by at least about 97.5% to obtain the first diluted reaction solution.

18. The method of claim 12, wherein the target element concentration of the concentrated aqueous source solution is about 400-500 ppb, and the target element concentration of the first diluted reaction solution is about 1 to 10 ppb.

19. The method of claim 12, wherein a ratio of a volumetric injection rate of the concentrated aqueous source solution to a volumetric flow rate of the aqueous stream is about 1:90.

* * * * *